(12) United States Patent
Ichimura

(10) Patent No.: US 6,801,426 B2
(45) Date of Patent: Oct. 5, 2004

(54) DISPLAY DEVICE WITH PIVOTABLE BASE

(75) Inventor: Naohiko Ichimura, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/944,595

(22) Filed: Sep. 4, 2001

(65) Prior Publication Data

US 2002/0149906 A1 Oct. 17, 2002

(30) Foreign Application Priority Data

Apr. 16, 2001 (JP) ........................................ 2001-117285

(51) Int. Cl.[7] .............................................. G06F 1/16
(52) U.S. Cl. .................... 361/681; 361/682; 312/223.2; 248/349.1; 248/371
(58) Field of Search ................................ 361/679–683, 361/686; 312/223.2, 223.3; 248/349.1, 917–923, 371, 398, 144, 145

(56) References Cited

U.S. PATENT DOCUMENTS

| 3,936,026 | A | * | 2/1976 | Hampel et al. | 248/349.1 |
| 4,552,418 | A | * | 11/1985 | Sarnezki et al. | 312/242 |
| 4,566,663 | A | * | 1/1986 | Barchus | 248/324 |
| 4,570,892 | A | * | 2/1986 | Czech et al. | 248/372.1 |
| 4,589,713 | A | * | 5/1986 | Pfuhl et al. | 439/162 |
| 4,591,120 | A | * | 5/1986 | Bryant-Jeffries et al. | 248/179.1 |
| 4,621,782 | A | * | 11/1986 | Carlson et al. | 248/183.3 |
| 4,852,830 | A | * | 8/1989 | Howard et al. | 248/183.2 |
| 4,858,864 | A | * | 8/1989 | Thompson | 248/176.3 |
| 4,880,191 | A | * | 11/1989 | Lake, Jr. | 248/371 |
| 4,919,387 | A | * | 4/1990 | Sampson | 248/371 |
| 5,024,415 | A | * | 6/1991 | Purens | 248/349.1 |
| 5,102,082 | A | * | 4/1992 | Bang | 248/183.2 |
| 5,149,043 | A | * | 9/1992 | Grundmann | 248/349.1 |
| 5,168,423 | A | * | 12/1992 | Ohgami et al. | 361/681 |
| 5,209,446 | A | * | 5/1993 | Kawai | 248/183.2 |
| 5,335,142 | A | * | 8/1994 | Anderson | 361/681 |
| 5,518,216 | A | * | 5/1996 | Wu | 248/371 |
| 5,632,463 | A | * | 5/1997 | Sung et al. | 248/371 |
| 5,687,944 | A | * | 11/1997 | Shon | 248/349.1 |
| 5,732,922 | A | * | 3/1998 | Jeon | 248/371 |
| 5,881,985 | A | * | 3/1999 | Hoenig | 248/371 |
| 5,895,022 | A | * | 4/1999 | Kim | 248/398 |
| 6,007,038 | A | * | 12/1999 | Han | 248/371 |
| 6,024,335 | A | | 2/2000 | Min | 248/371 |
| 6,231,020 | B1 | * | 5/2001 | Willson | 248/349.1 |
| 2002/0053629 | A1 | * | 5/2002 | Hokugoh | 248/371 |

FOREIGN PATENT DOCUMENTS

| JP | 10-143084 | 5/1998 |
| JP | 10-275025 | 10/1998 |
| JP | 11-154036 | 6/1999 |
| JP | 11-190978 | 7/1999 |
| JP | 2000308248 A | * 11/2000 ........... H02G/11/02 |

* cited by examiner

*Primary Examiner*—Anatoly Vortman
(74) *Attorney, Agent, or Firm*—Westerman, Hattori, Daniels & Adrian, LLP

(57) ABSTRACT

A display device includes a display part, and a base part supporting the display part. The base part is composed of a tilt unit for mounting the display part rotatably about a horizontal axis, a tilt base for directly or indirectly supporting the tilt unit, and a receiving plate disposed in the facing relationship with the tilt base. A guide part is provided on one of the tilt base and the receiving plate, for guiding the tilt base and the receiving plate for relative rotation about a vertical axis. Ball-shaped or mushroom shaped low friction members are disposed between the tilt base and the receiving plate. The display part can be thus rotated about the horizontal and vertical axes.

4 Claims, 19 Drawing Sheets

DISPLAY DEVICE WITH PIVOTABLE BASE

BACKGROUND OF THE INVENTION

1. Field of the Invention

The present invention relates to a display device as represented by a display unit by itself, such as a CRT or an LCD or an information processing device having a display unit, such as a CRT or an LCD, incorporated therein.

2. Description of the Related Art

A display unit such as a CRT or an LCD (liquid crystal display device) is used with an information processing device such as a personal computer. The display unit is connected to the personal computer via a cable, or the display unit is incorporated in the body of the personal computer. For example, Japanese Unexamined Patent Publication (Kokai) No. 11-190978 discloses a liquid crystal display monitor having a magnetic disk unit and an optical disk therein. Japanese Unexamined Patent Publication (Kokai) No. 11-154036 discloses a desktop computer integrally including a display unit and being supported for rotation about a horizontal axis. Japanese Unexamined Patent Publication (Kokai) No. 10-275025 discloses a desktop computer integrally including a display unit and being displaceably supported by a supporting unit.

Conventionally, a display device is supported for rotation about a horizontal axis so that a user can use the display unit at a desired position. Recently, there has been demanded a display device that is supported for rotation about a vertical axis. For example, Japanese Unexamined Patent Publication (Kokai) No. 10-143084 discloses a display device that is supported for rotation not only about a horizontal axis but also about a vertical axis.

The display device that is supported for rotation about a vertical axis as well as about a horizontal axis has an advantage in that the display device can be used at a position in a relatively narrow area. When such a display device is used, a person located adjacent to the user can look at the display without changing position.

A mechanism for rotatably supporting the display unit about a horizontal axis has so far been widely used as a tilt unit. However, a mechanism for rotatably supporting the display unit about a vertical axis has not been developed as much. For example, the above described Japanese Unexamined Patent Publication (Kokai) No. 10-143084 discloses a display unit that has a mechanism for rotatably supporting the display unit about a horizontal axis, and a mechanism for rotatably supporting the display unit about a vertical axis. In this display unit, the mechanism for rotatably supporting the display unit about a horizontal axis includes a horizontal shaft for rotatably supporting the display unit about a horizontal axis, and a mechanism for rotatably supporting the display unit about the vertical axis is provided at a position eccentric from the horizontal shaft. The mechanism for rotatably supporting the display unit about the vertical axis comprises a first member having a hole at the center, and a second member having a vertical shaft provided at a position corresponding to the hole of the first member. The vertical shaft of the second member is inserted into the hole of the first member, and the first member and the second member can relatively rotation around the axis of this vertical shaft. In this structure, the first member is rotated relative to the second member while the bottom surface of the first member and the upper surface of the second member slide over each other.

However, in the mechanism where the bottom surface of the first member and the upper surface of the second member slide over each other, there is relatively large friction between the two surfaces, and when the display device has large weight, a relatively large force is necessary for rotating the first member relative to the second member. This mechanism suffers from a problem in that it is difficult to easily rotate the display unit to a desired position, because a large force is necessary.

SUMMARY OF THE INVENTION

It is an object of the present invention to provide a display device which has a relatively simple structure and in which a display unit or part can rotate about a first axis and about a second axis.

A display device according to the present invention comprises a display part and a base part supporting the is display part. The base part comprises a tilt unit mounting the display part for rotation about a first axis, a first member directly or indirectly supporting the tilt unit, a second member disposed in a facing relationship with the first member, a guide part provided on one of the first member and the second member for guiding the first member and the second member for relative rotation therebetween about a second axis different from the first axis, and at least one low friction member disposed between the first member and the second member.

In the above structure, the display device is supported for rotation not only about the first axis (for example, a horizontal axis) but also about the second axis (for example, a vertical axis), so it is possible to use the display device at a position in a relatively narrow area and to change its direction. As a result, it is possible to mitigate limits in a space in which the display device is disposed. Further, the load of the display part is transmitted from the first member to the second member through at least one low-friction member, so it is easily possible to rotate the display device to a desired position about the second axis (for example, the vertical axis).

BRIEF DESCRIPTION OF THE DRAWINGS

The present invention will become more apparent from the following description of the preferred embodiments, with reference to the accompanying drawings, in which.

DESCRIPTION OF THE PREFERRED EMBODIMENTS

Figure 1:
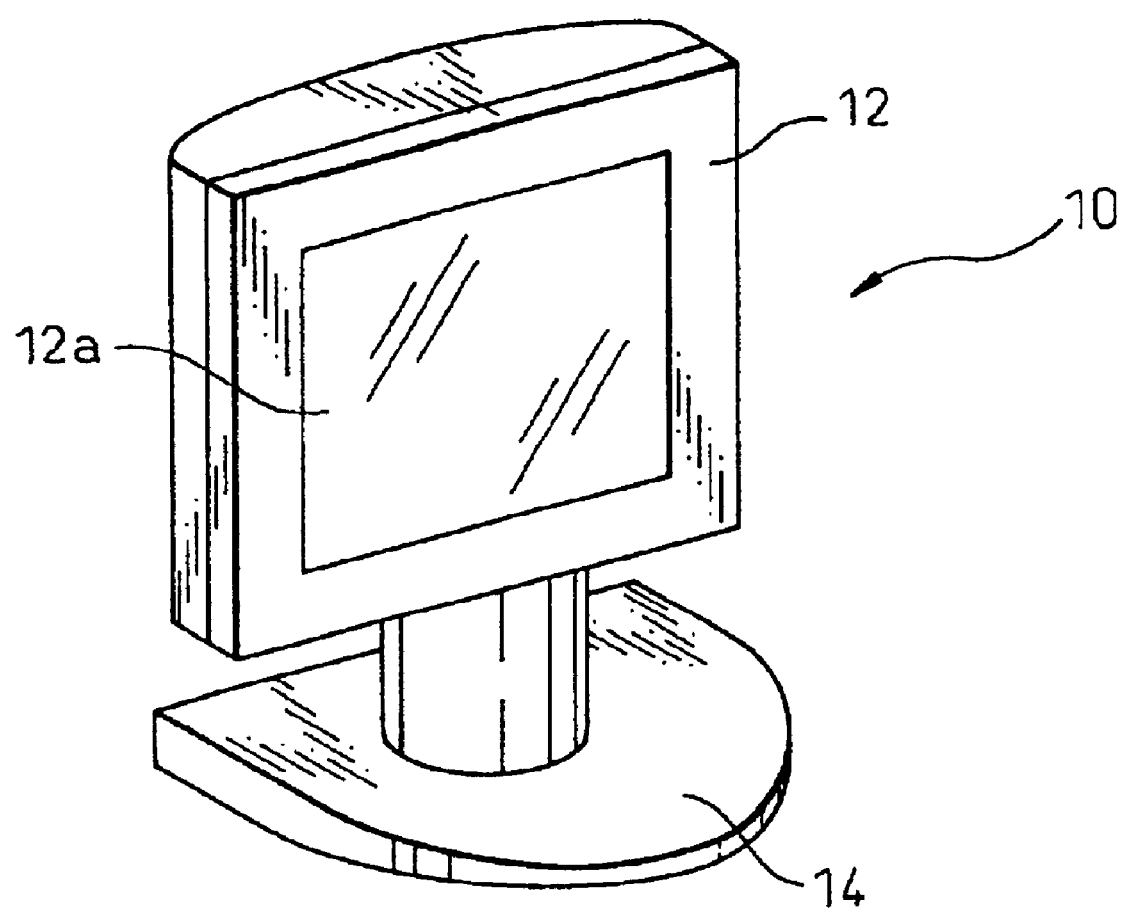
FIG. 1 is a perspective view showing a display device according to a first embodiment of the present invention.

Embodiments of the present invention will be explained below with reference to the drawings. FIG. 1 is a view showing a display device 10 according to a first embodiment of the present invention. The display device 10 comprises a display part 12 and a base part 14 supporting the display part 12. The display part 12 has a display 12a for displaying images. The display part 12 includes a display unit such as a liquid crystal display device or a CRT.

Figure 2:
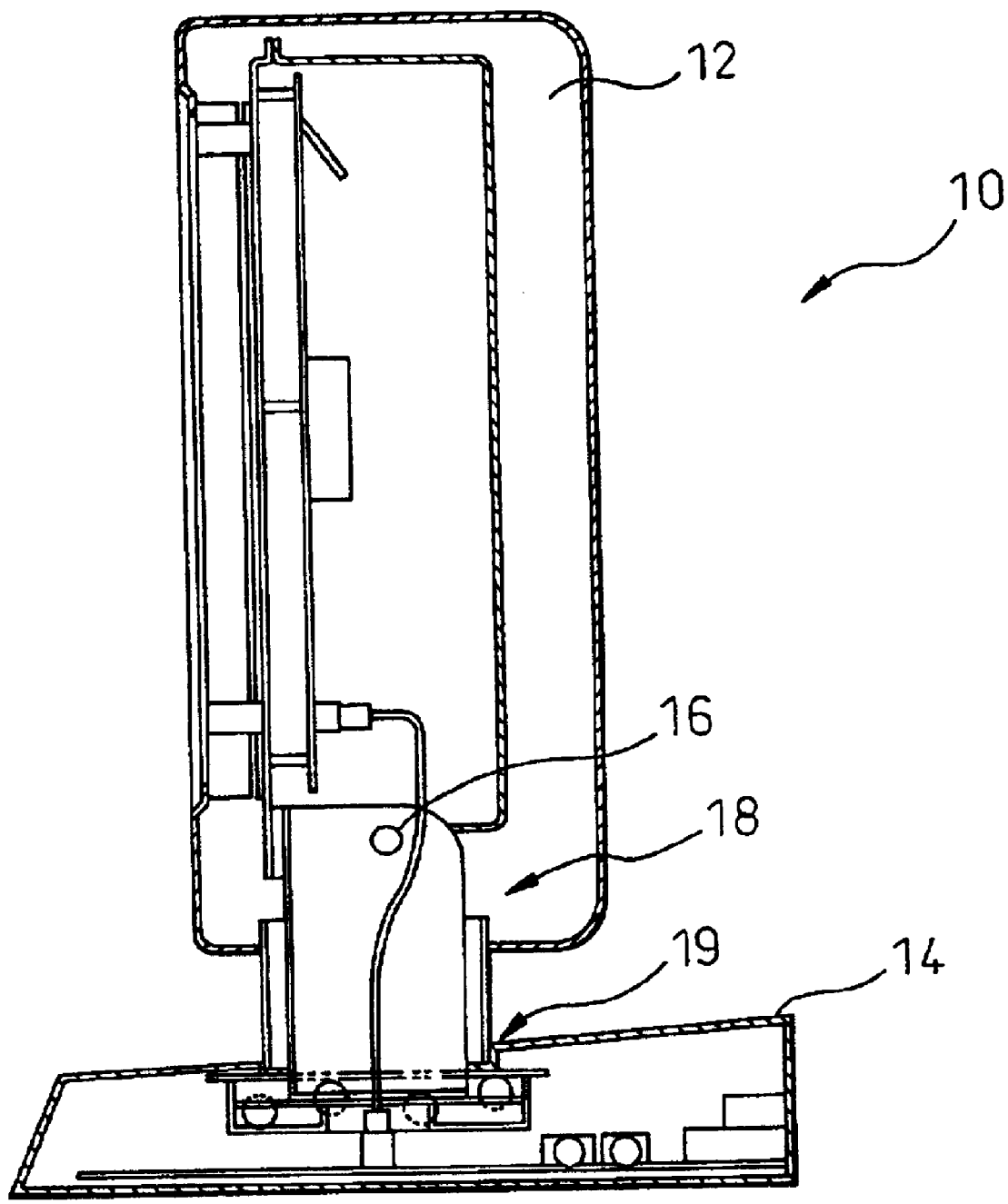
FIG. 2 is a schematic cross-sectional view of the display device shown in FIG. 1.

FIG. 2 is a schematic cross-sectional view of the display device 10. The base part 14 includes a tilt unit 18 having a horizontal shaft 16, and a rotation supporting mechanism 19 for supporting the tilt unit 18.

Figure 3:
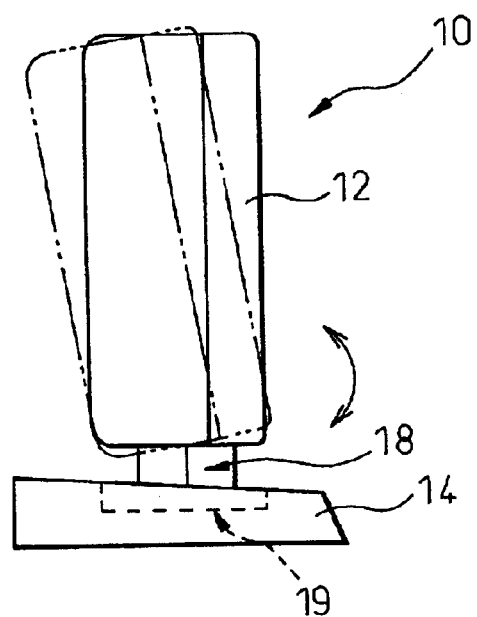
FIG. 3 is a schematic view showing the rotation of the display device about the first axis (for example, a horizontal axis)
Figure 4:
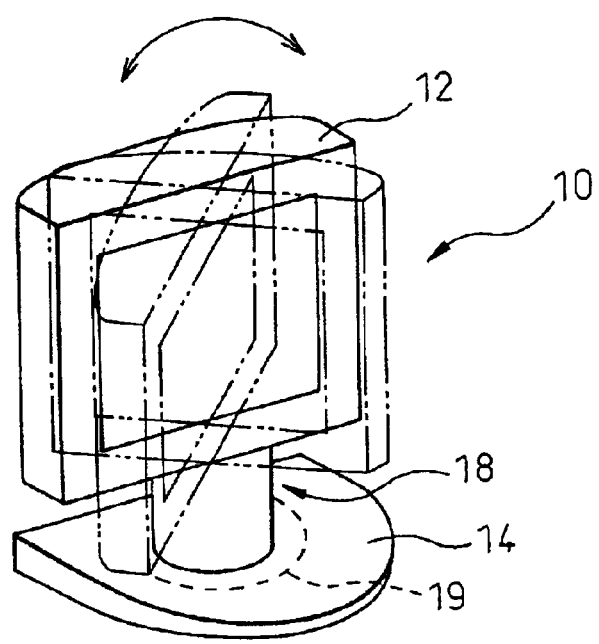
FIG. 4 is a schematic view showing the rotation of the display device about the second axis (for example, a vertical axis)
Figure 7:
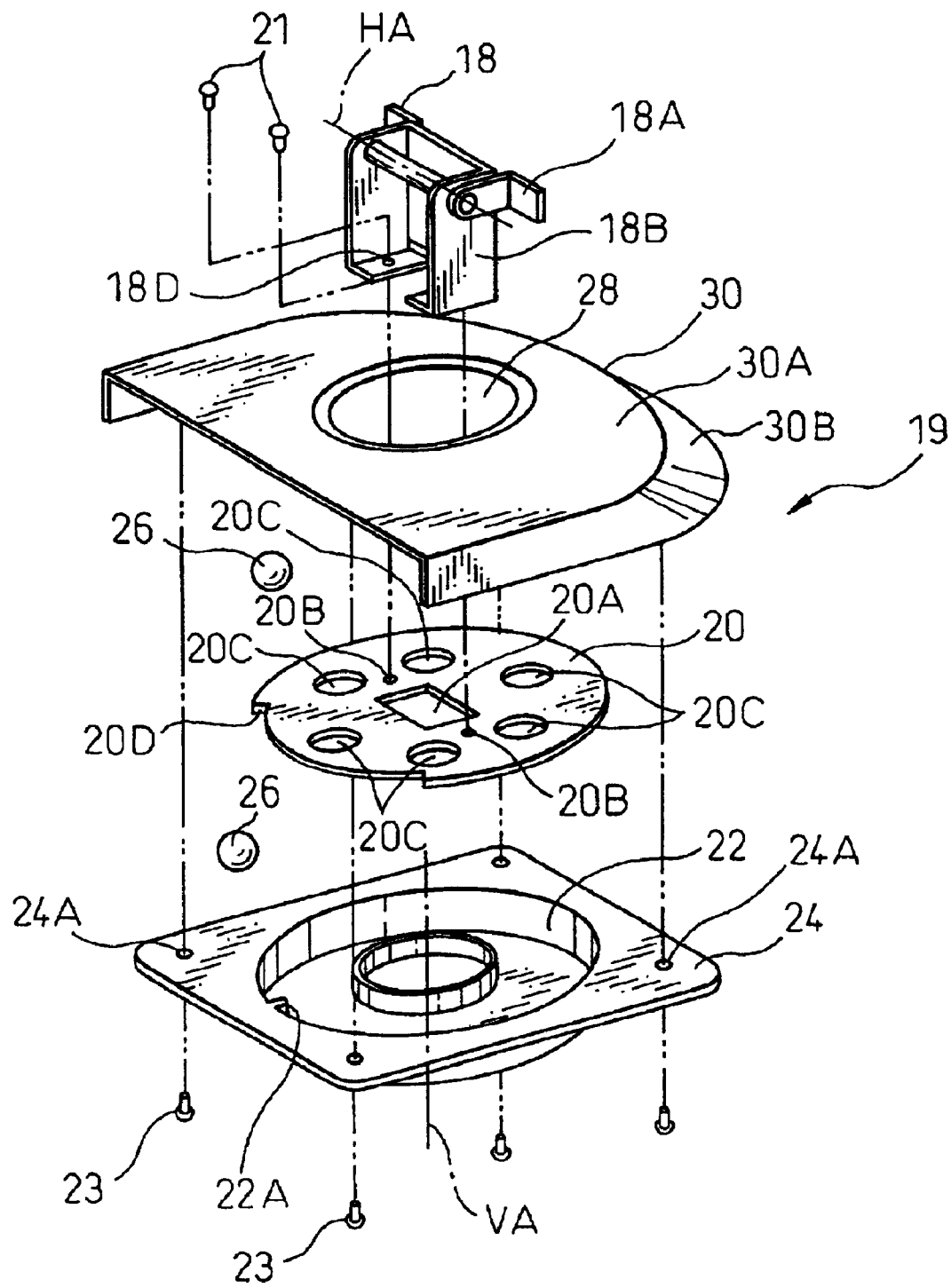
FIG. 7 is an exploded perspective view of the rotation supporting mechanism shown in FIG. 5.

Therefore, the display part 12 can rotate about a first axis (a horizontal axis HA of the horizontal shaft 16, FIG. 7), as shown in FIG. 3, and can rotate about a second axis (a vertical axis VA of a guide part 22 of a receiving plate 24, FIG. 7), as shown in FIG. 4. In FIG. 3, the solid line shows the display part 12 in a vertical position, and a two-dot chain line shows the display part 12 at a position inclined backward. In FIG. 4, the solid line shows the display part 12 at a position facing the front, and a two-dot chain line shows the display part 12 in an inclined position.

Figure 5:
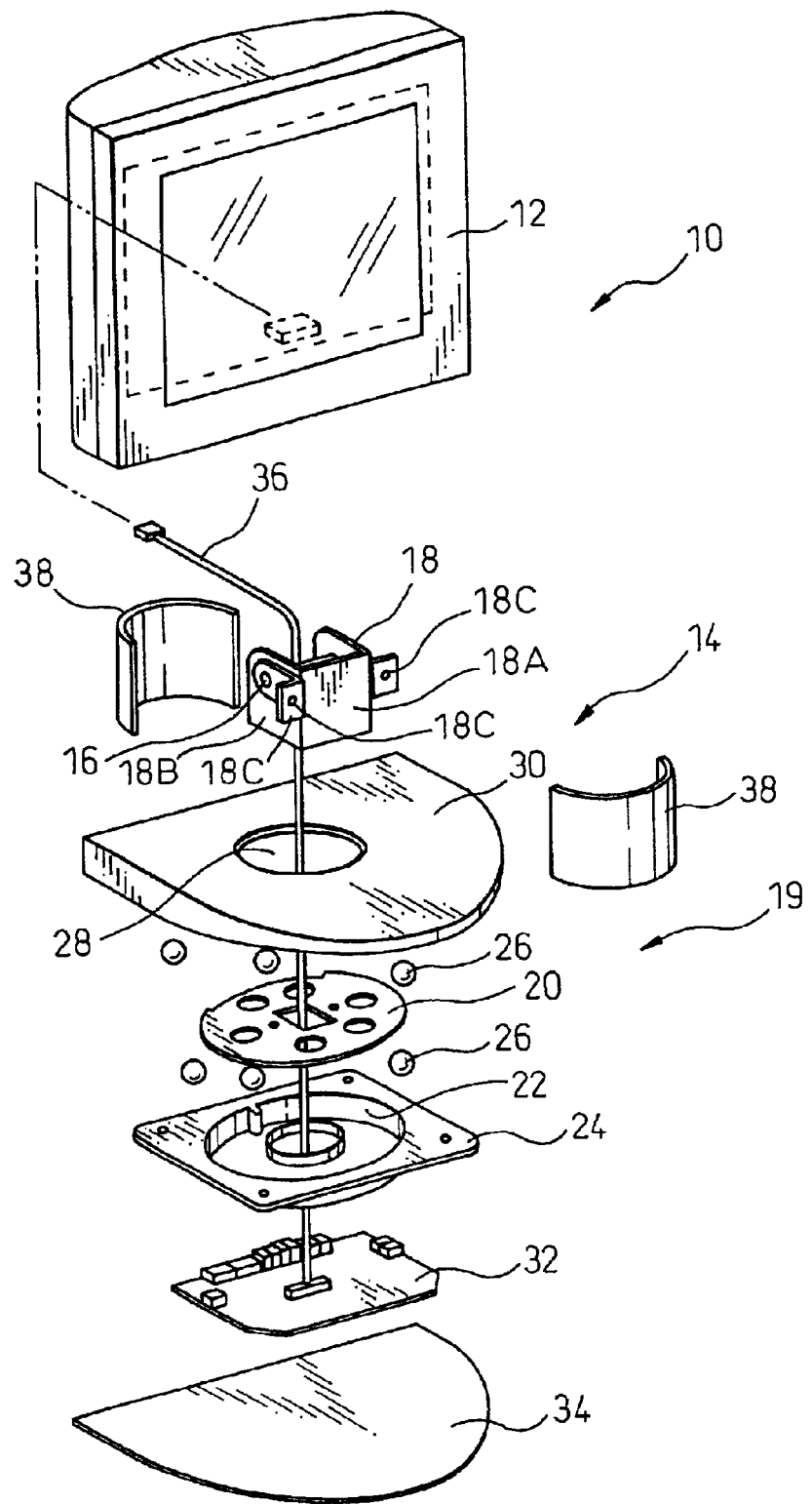
FIG. 5 is a fragmentary perspective view showing the base part of the display device shown in FIGS. 1 to 4.

FIG. 5 is an exploded perspective view of the base part 14 of the display device 10 of FIGS. 1 to 4.

Figure 6:
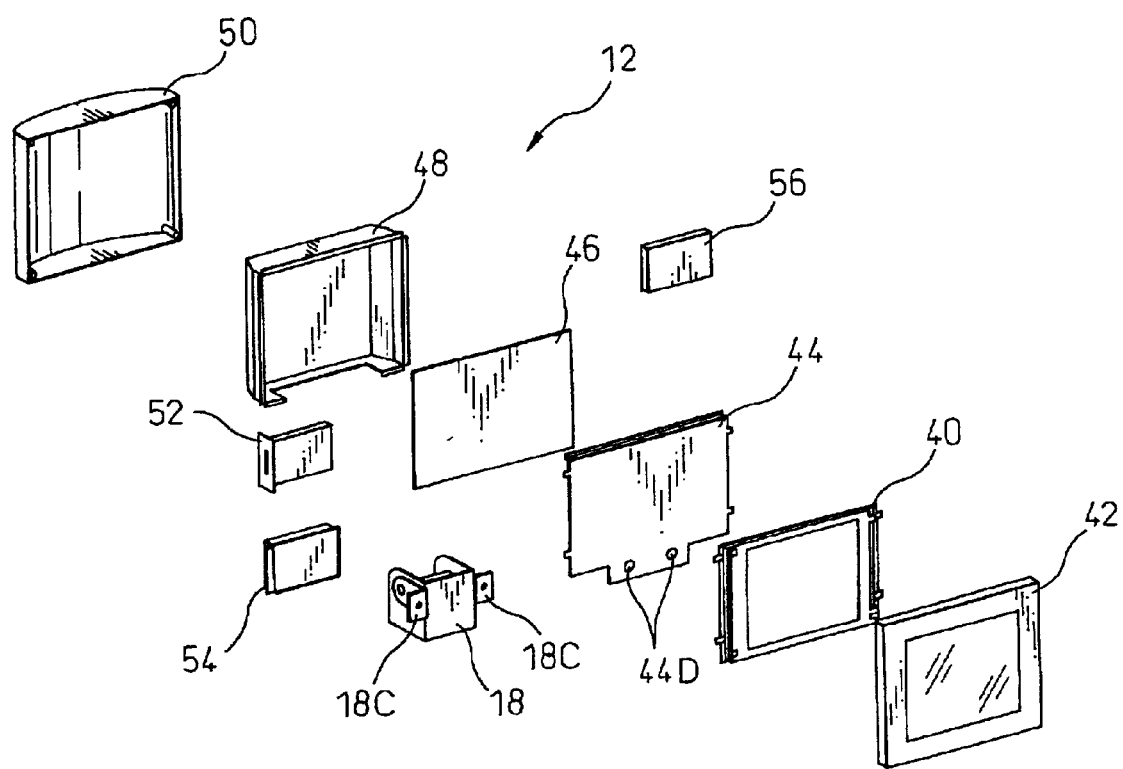
FIG. 6 is an exploded perspective view showing the display part of the display device shown in FIGS. 1 to 5.

FIG. 6 is an exploded perspective view of the display part 12 of the display device 10 of FIGS. 1 to 5.

In FIG. 5, the base part 14 comprises the tilt unit 18, a tilt base (a first member) 20 supporting the tilt unit 18, the receiving plate (a second member) 24 having a guide part 22 for disposing the tilt base 20 to be rotatable about the vertical axis, and a plurality of low friction members 26 disposed between the tilt base 20 and the receiving plate 24 for transmitting the load of the tilt base 20 (the load of the display part 12 applied to the tilt base 20) to the receiving plate 24. The receiving plate 24 and the low friction members 26 constitute the rotation supporting mechanism 19.

The base part 14 also comprises a base cover 30 having an aperture 28, and the tilt unit 18 is fixed to the tilt base 20 through the aperture 28 of the base cover 30. The tilt base 20 is disposed between the base cover 30 and the receiving plate 24. A connector board 32 and a base plate 34 are disposed beneath the saucer 24. The base plate 34 is disposed at a lower portion of the base part 14, and has an area and weight sufficient to support the display part 12. A cable 36 extends from the display part 12 to the connector board 32 through apertures of the base cover 30, the tilt base 20, and the receiving plate 24, respectively. Tilt covers 38 are disposed around the tilt unit 18.

The tilt unit 18 comprises two frame members 18A and 18B pivotally coupled together by the shaft 16. The frame member 18A has screw holes 18C for fixing the display part 12. The frame member 18B has fixing holes 18D (FIG. 7) for fixing the tilt unit 18 to the tilt base 20.

Figure 15:
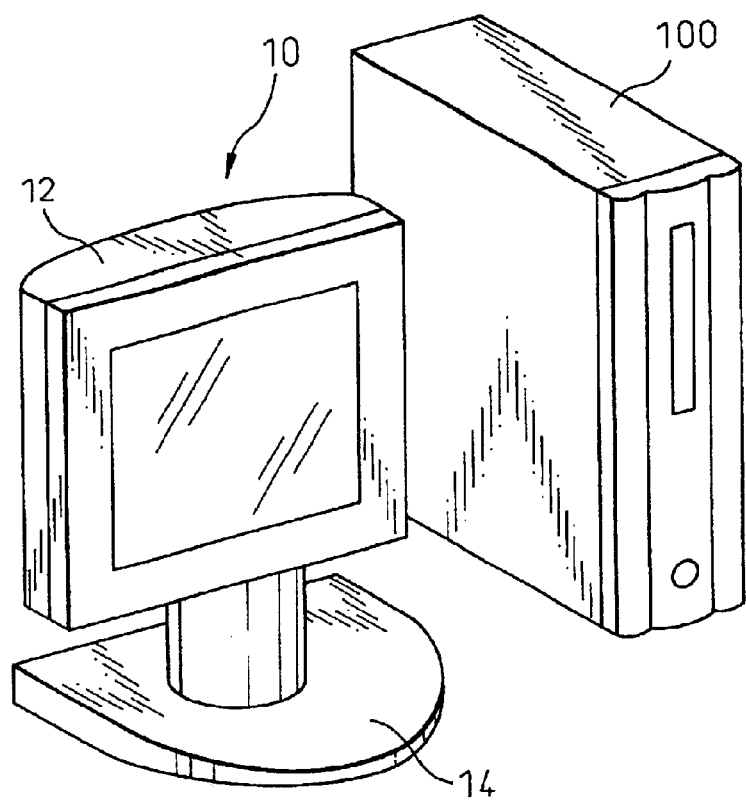
FIG. 15 is a diagram showing an example of a display unit formed separate from a personal computer.

In FIG. 6, the display part 12 includes a liquid crystal display device 40 as a display unit. The liquid crystal display device 40 is held by a front cover 42 and a chassis 44. Further, the display part 12 includes a motherboard 46, a MB shield 48, a back cover 50, an HDD unit 52, an FDD unit 54, and a CDROM unit 56. These members are attached to the chassis 44. The chassis 44 has fixing holes 44D corresponding to the screw holes 18C of the tilt unit 18. Therefore, the display part 12 is fixed to the tilt unit 18 with screws (not shown) meshed with the screw holes 18C through the fixing holes 44D. This example shows that the display part 12 is formed as a personal computer having a liquid crystal display unit incorporated therein. However, the present invention is not limited to the personal computer having a liquid crystal display unit integrated together. For example, FIG. 15 shows an example of a tower-type personal computer, in which a display device 10 is formed as a unit separate from the body of a personal computer 100. In this display device 10, the display part 12 is also formed to be able to rotate around first and second axis, as in the case of the display device 10 shown in FIGS. 1 to 10.

Figure 8:
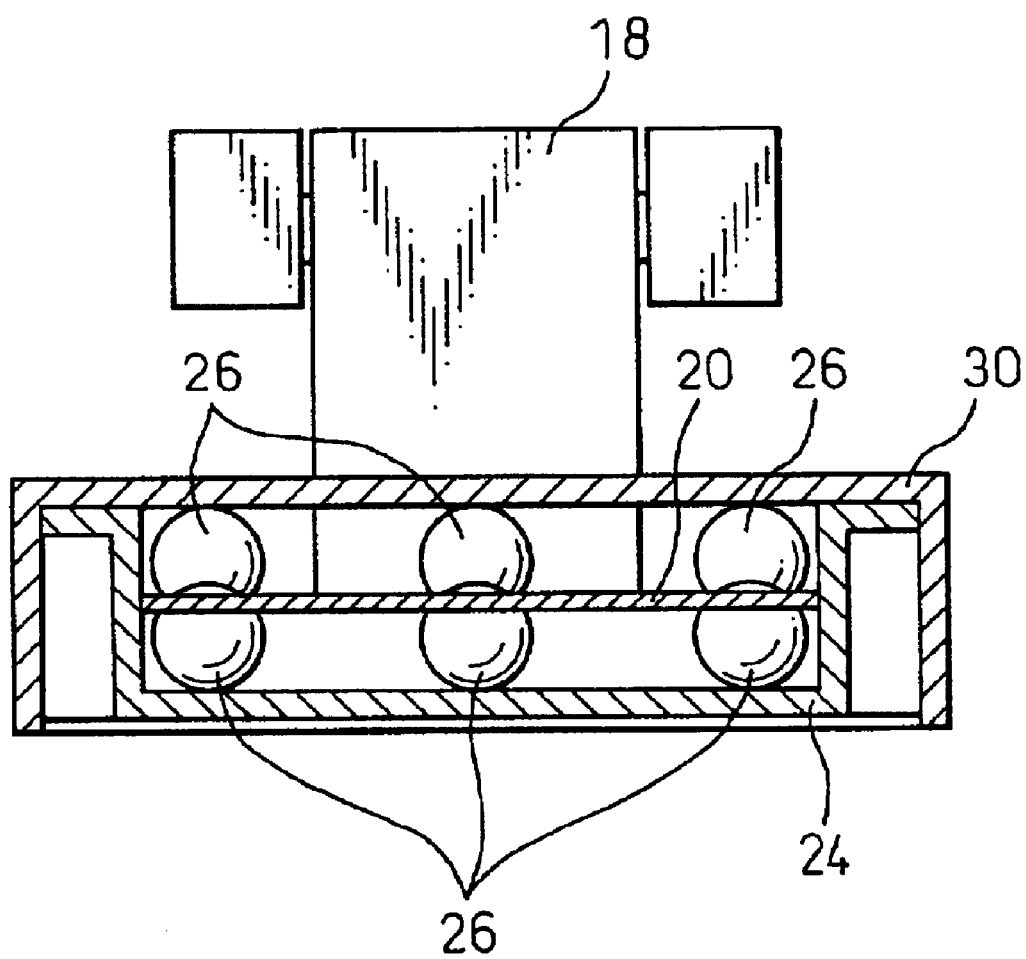
FIG. 8 is a cross-sectional view showing the rotation supporting mechanism of FIG. 7 in the assembled state.

FIG. 7 is an exploded perspective view of the rotation supporting mechanism 19 shown in FIG. 5. FIG. 8 is a cross-sectional view showing the rotation supporting mechanism 19 of FIG. 7 in the assembled state. The base cover 30 comprises of a flat portion 30A having an aperture 28, and a skirt portion 30B. The tilt base 20 is a circular flat plate, and has a square aperture 20A at the center, fixing screw holes 20B, and six ball supporting holes 20C disposed at circumferential intervals. Screws 21 are passed through the fixing holes 18D of the tilt unit 18, and are meshed with the fixing screw holes 20B of the tilt base 20, so that the tilt unit 18 is fixed to the tilt base 20. Further, a rotation limiting groove 20D is provided on the periphery of the tilt base 20.

The receiving plate 24 comprises a square flat plate and has a circular recessed portion (the guide part 22) formed in the square flat plate substantially coincidence with the circular external periphery of the tilt base 20. The tilt base 20 is loosely fitted in the guide part 22, so that the tilt base 20 is disposed in the receiving plate 24 for rotation about the vertical axis VA of the guide part 22. A bulge 22A is provided on the guide part 22. The end wall of the rotation limiting groove 20D of the tilt base 20 is engaged with the bulge 22A, thereby to limit the rotation angle of the tilt base 20 relative to the receiving plate 24. Therefore, the rotation angle of the display part 12 relative to the base part 14 is limited. The flat plate of the receiving plate 24 has fixing holes 24A at the corners, and the base cover 30 has screw holes. The tilt base 30 is fixed to the receiving plate 24 with screws 23 that pass through the holes 24A of the receiving plate 24 and are meshed with the screw holes of the base cover 30.

Figure 9:
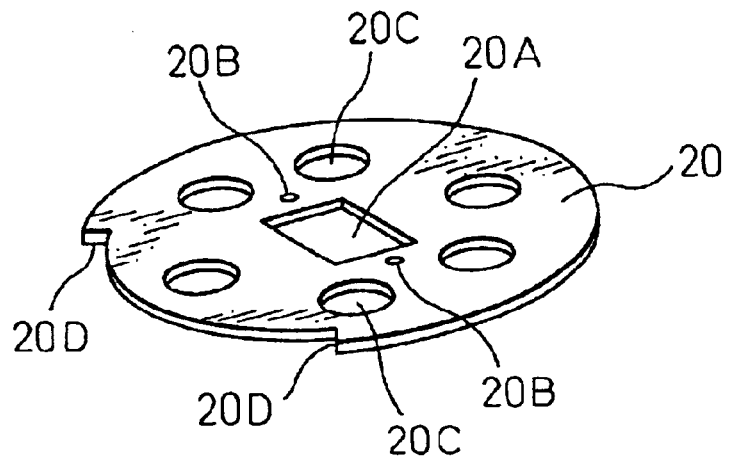
FIG. 9 is a perspective view showing the tilt base of FIGS. 7 and 8.
Figure 10:
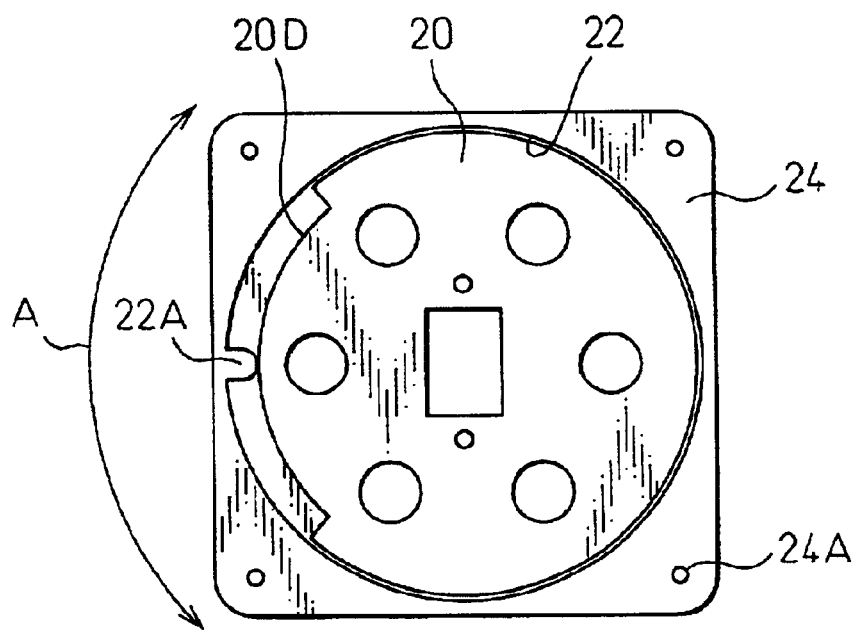
FIG. 10 is a top plan view showing the receiving plate with the tilt base disposed on in the guide part.

FIG. 9 is a perspective view showing the tilt base 20. FIG. 10 is a top plan view showing the receiving plate 24 with the tilt base 20 disposed in the guide part 22. The arrow A shows the range within which the tilt base 20 can rotate due to the relationship between the rotation limiting groove 20D of the tilt base 20 and the bulge 22A of the receiving plate 24.

In FIGS. 5, 7 and 8, the low friction members 26 are formed as bearing balls disposed in the ball supporting holes 20C of the tilt base 20. The diameter of each low friction member 26 is larger than the diameter of each ball supporting hole 20C. In this example, there are six ball supporting holes 20C. Three of these low friction members 26 are disposed in three of the ball supporting holes 20C on the upper side of the tilt base 20, and the other three low friction members 26 are disposed in the other three ball supporting holes 20C on the lower side of the tilt base 20.

The three low friction members 26 on the lower side of the tilt base 20 rotate between the tilt base 20 and the receiving plate 24, and the low friction members 26 transmit the load of the tilt base 20 (the load of the display part 12 applied to the tilt base 20) to the receiving plate 24. The three low friction members 26 on the upper side of the tilt base 20 rotate between the tilt base 20 and the base cover 30, and maintain a horizontal posture of the tilt base 20. The low friction members 26 permit the display part 12 to rotate on the base part 14 with considerably smaller friction than the friction applied when the tilt base 20 slides directly on the receiving plate 24. With this arrangement, the display part 12 can easily rotate on the base part 14.

Figure 11:
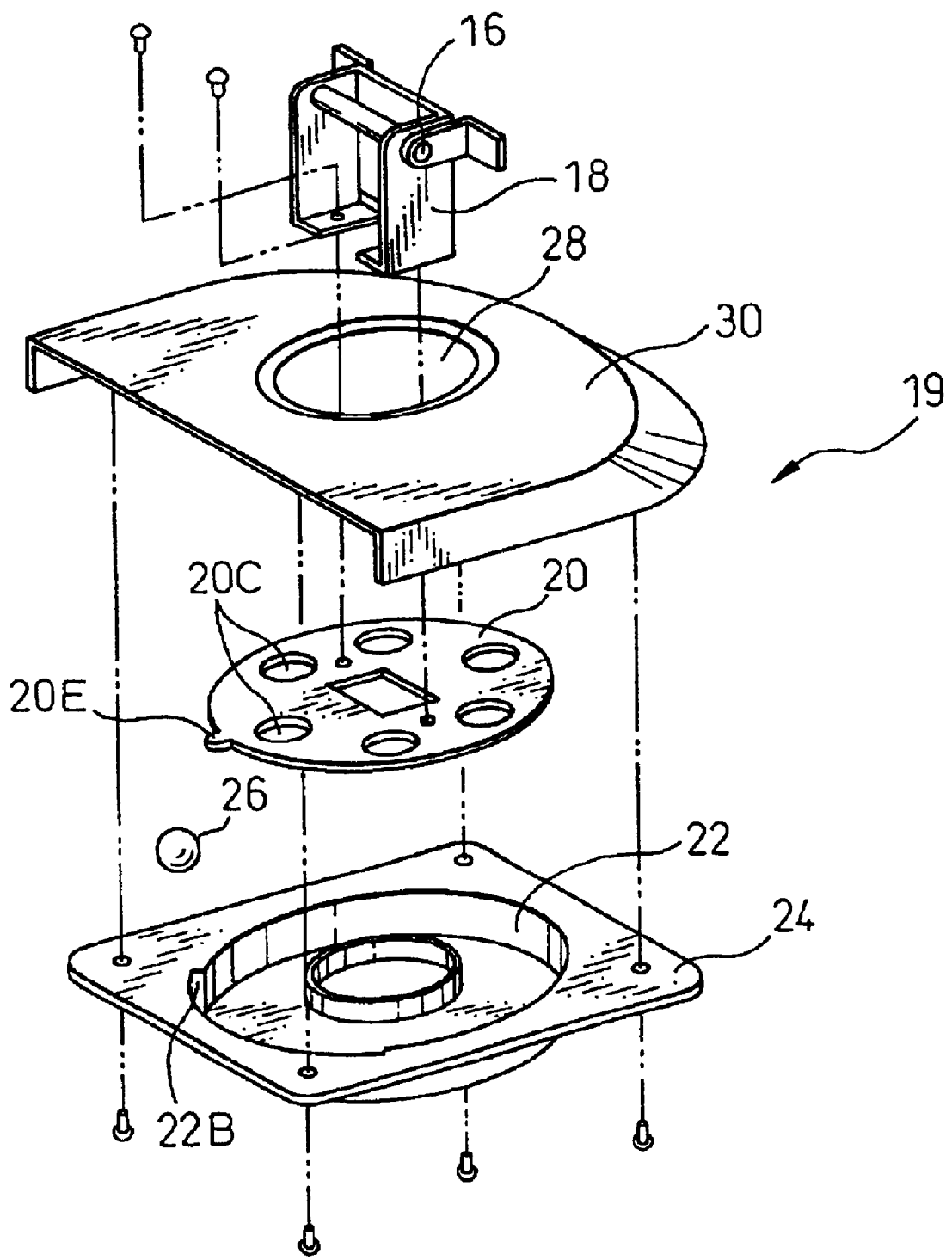
FIG. 11 is an exploded perspective view showing a modified example of the rotation supporting mechanism of the display device of FIGS. 7 and 8.
Figure 12:
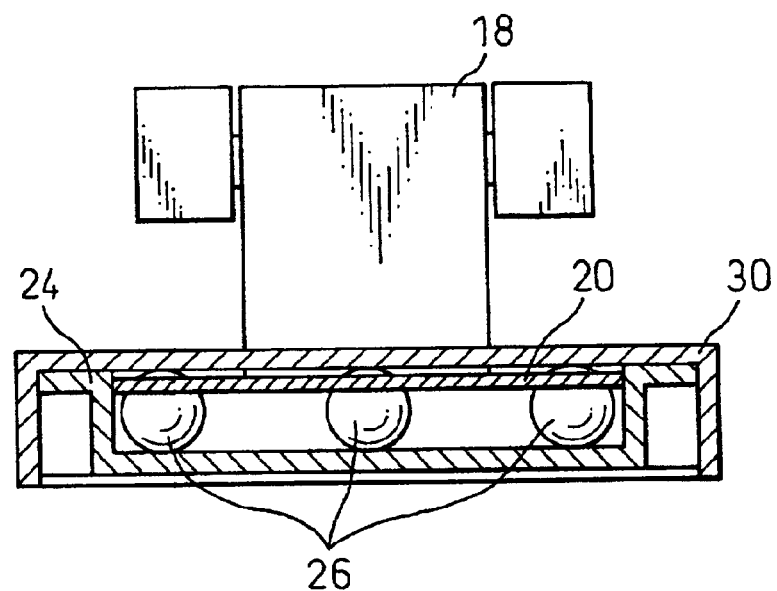
FIG. 12 is a cross-sectional view showing the rotation supporting mechanism of FIG. 11 in the assembled state.

FIG. 11 is an exploded perspective view showing a modified example of the rotation supporting mechanism 19 of the display device 10 of FIGS. 7 and 8. FIG. 12 is a cross-sectional view of showing the rotation supporting mechanism 19 of FIG. 11 in the assembled state.

In this example too, the base part 14 of the display device 10 comprises the base cover 30, the tilt unit 18, the tilt base 20, the receiving plate 24, low friction members 26, the connector board 32 (refer to FIG. 5), and the base plate 34 (refer to FIG. 5). These members are basically similar to the corresponding members in the preceding embodiment.

In FIGS. 11 and 12, there are six ball supporting holes 20C. Six low friction members 26 are disposed in the six ball supporting holes 20C on the lower side of the tilt base 20, and low friction members 26 are not disposed on the upper side of the tilt base 20. The six low friction members rotate between the tilt base 20 and the receiving plate 24, and also rotate between the tilt base 20 and the base cover 30. The low friction members 26 permit the display part 12 to rotate on the base part 14 with considerably less friction than the friction applied when the tilt base 20 slides directly on the receiving plate 24. With this arrangement, the display part 12 can easily rotate on the base part 14.

Figure 13:
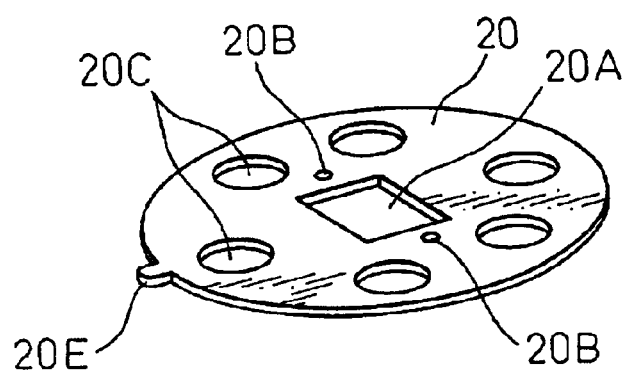
FIG. 13 is a perspective view showing the tilt base shown in FIGS. 11 and 12.
Figure 14:
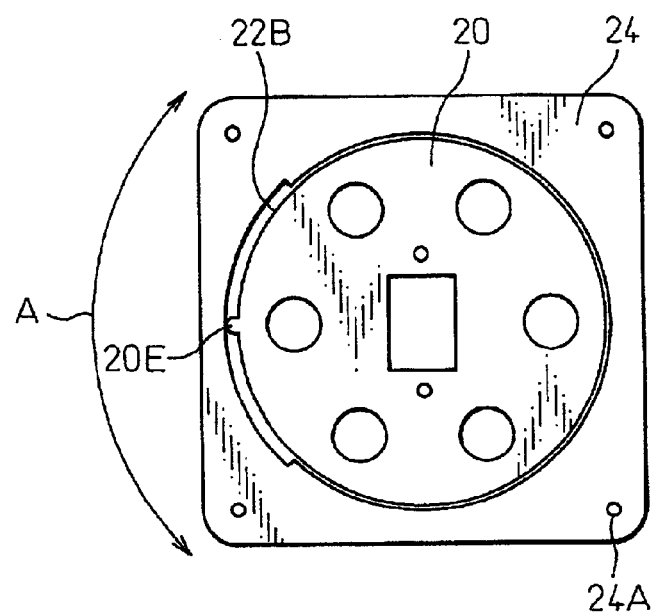
FIG. 14 is a top plan view showing the receiving plate with the tilt base shown in FIGS. 11 and 12 disposed in the guide part.

FIG. 13 is a perspective view of the tilt base 20. FIG. 14 is a top plan view of the receiving plate 24 with the tilt base 20 disposed in the guide part 22. In FIG. 11 to FIG. 13, the tilt base 20 has a bulge 20E, and the guide part 22 of the receiving plate 24 has a rotation limiting groove 22B. The arrow A shows the range within which the tilt base 20 can rotate under the relationship between the bulge 22E of the tilt base 20 and the rotation limiting groove 20B of the receiving plate 24. It is also possible to provide the bulge 20E and the rotation limiting groove 20B in the example shown in FIGS. 5 to 10. Alternatively, it is also possible to provide the rotation limiting groove 20D and the bulge 20A in FIGS. 11 to 14.

Figure 16:
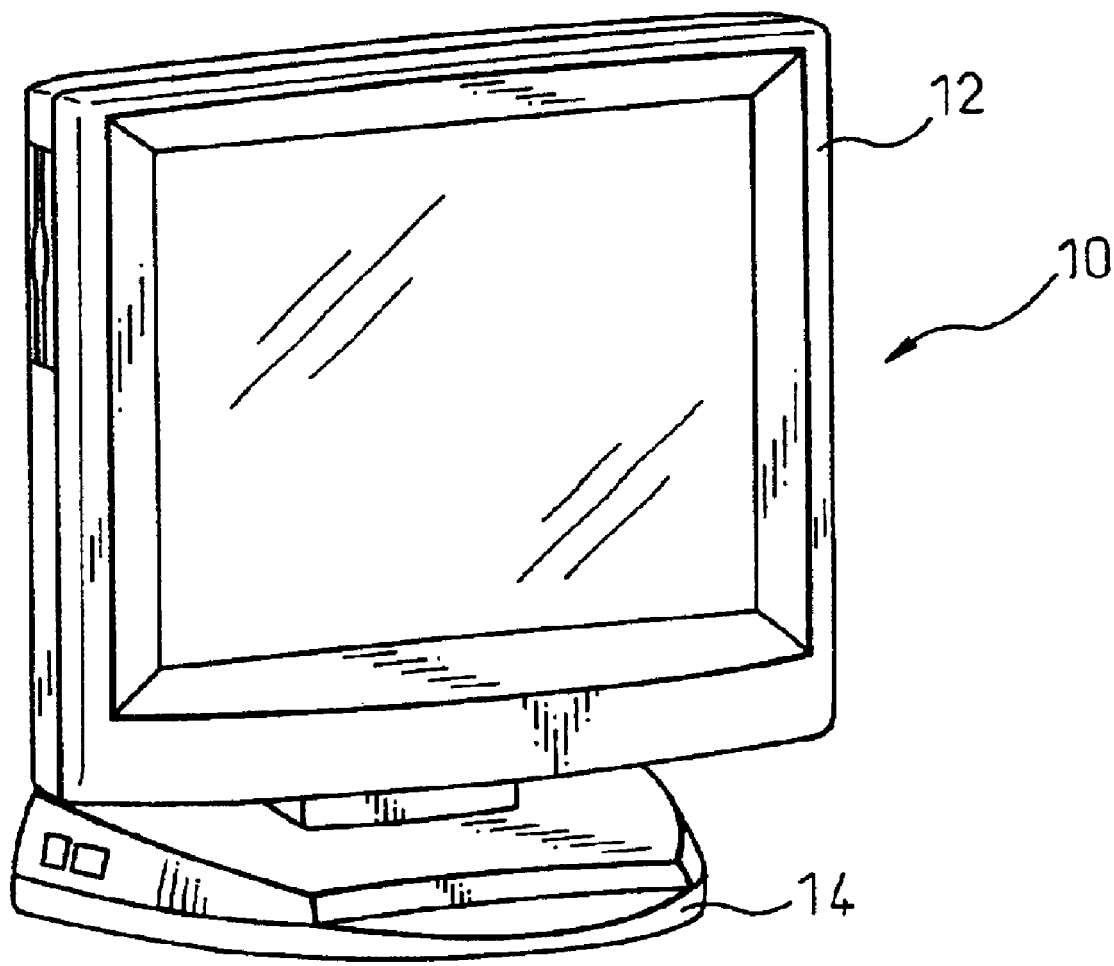
FIG. 16 is a front perspective view showing the display device according to a second embodiment of the present invention.
Figure 17:
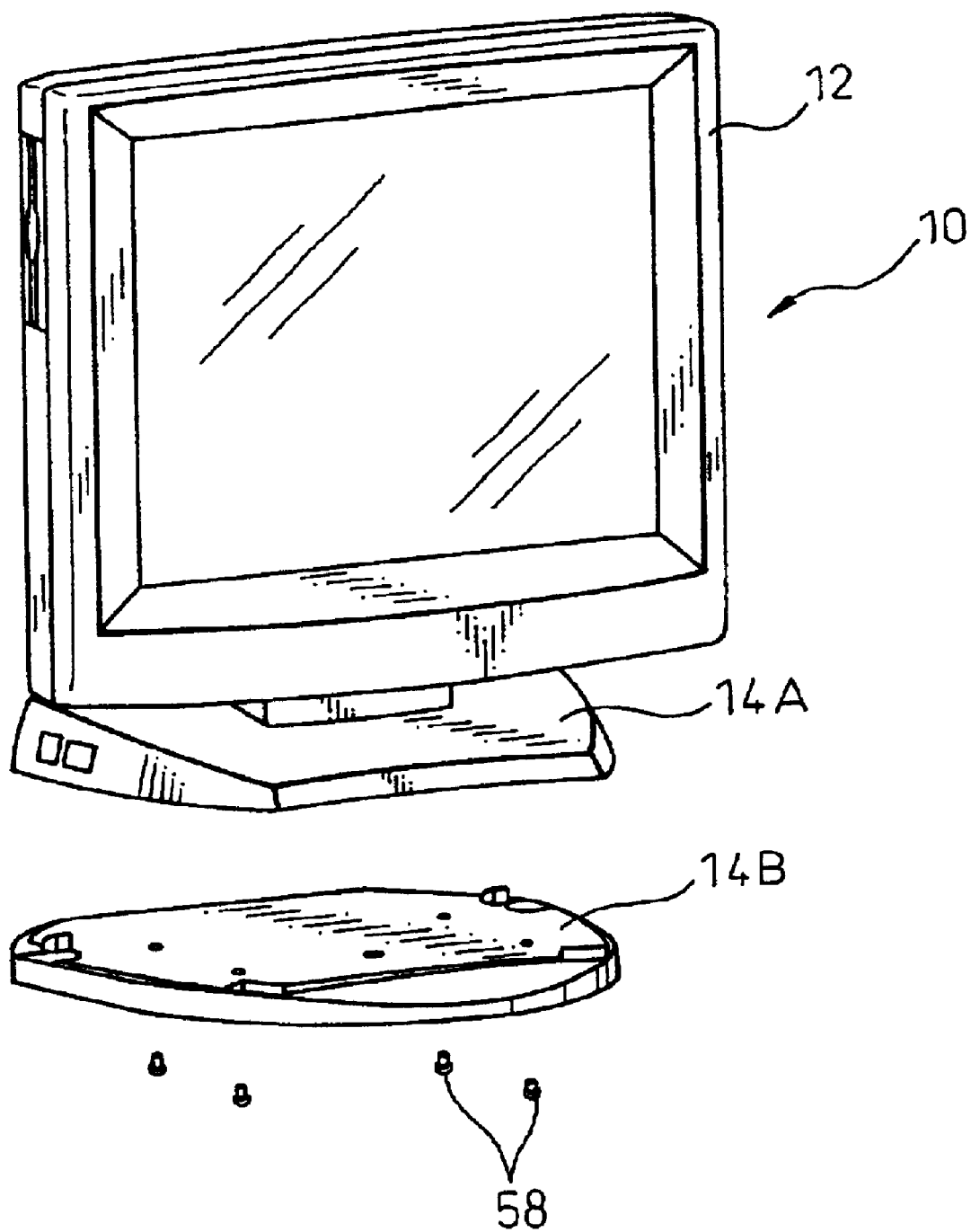
FIG. 17 is a perspective view showing the display device in the state before the swivel stand of the display device of FIG. 16 is installed.
Figure 18:
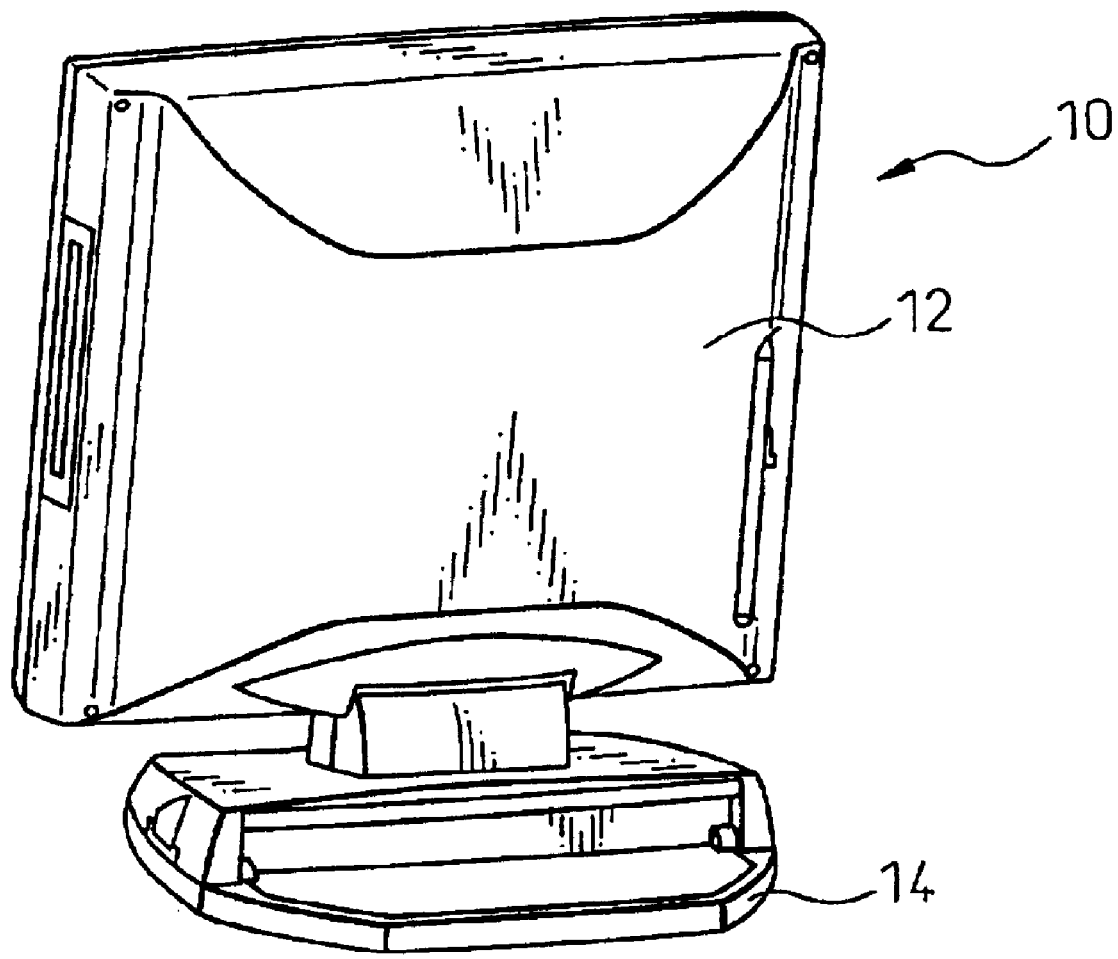
FIG. 18 is a back perspective view showing the display device of FIG. 17.
Figure 19:
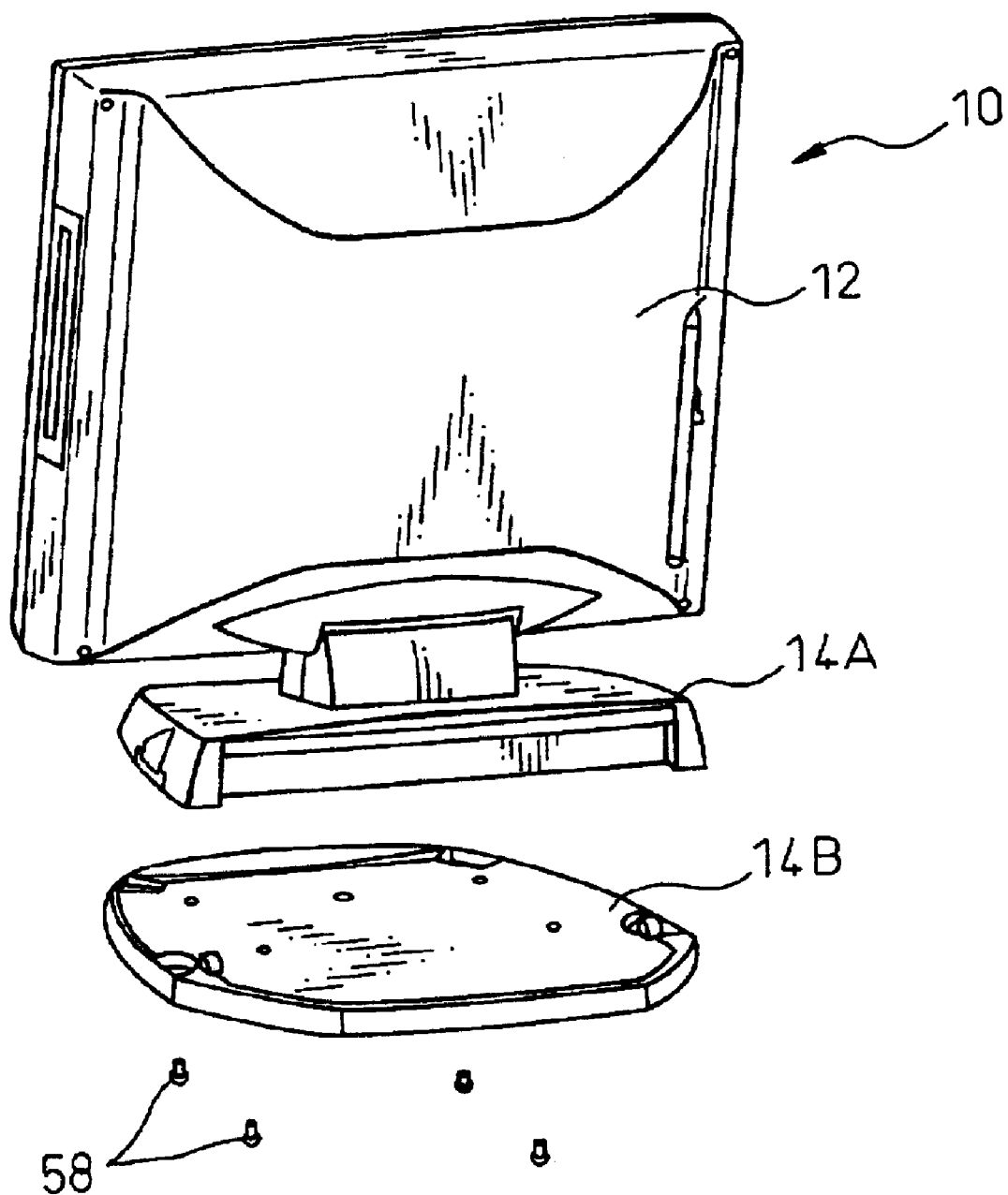
FIG. 19 is a perspective view showing the display device in the state before the swivel stand of the display device of FIG. 18 is installed.

FIG. 16 to FIG. 23 show a display device 10 according to a second embodiment of the present invention. FIG. 16 is a front perspective view of the display device 10. FIG. 17 is a perspective view of the display device 10 in the state before the swivel stand of FIG. 16 is installed. FIG. 18 is a back perspective view of the display device 10. FIG. 19 is a perspective view of the display device 10 in the state before the swivel stand shown of FIG. 18 is installed.

In FIG. 16 to FIG. 23, the display device 10 includes a display part 12, and a base part 14. The base part 14 comprises a fixed base part 14A, and a swivel stand 14B. The swivel stand 14B is detachably fitted to the fixed base station 14A with screws 58. In FIG. 16 and FIG. 18, the swivel stand 14B is fitted to the fixed base part 14A. In FIG. 17 and FIG. 19, the swivel stand 14B is not fitted to the fixed base part 14A. The swivel stand 14B includes functions similar to those of the rotation supporting mechanism 19 of the preceding embodiment. The display part 12 is formed as a personal computer having a liquid crystal display device incorporated therein. However, the present invention is not limited to the personal computer having a liquid crystal display unit incorporated therein.

Figure 20:
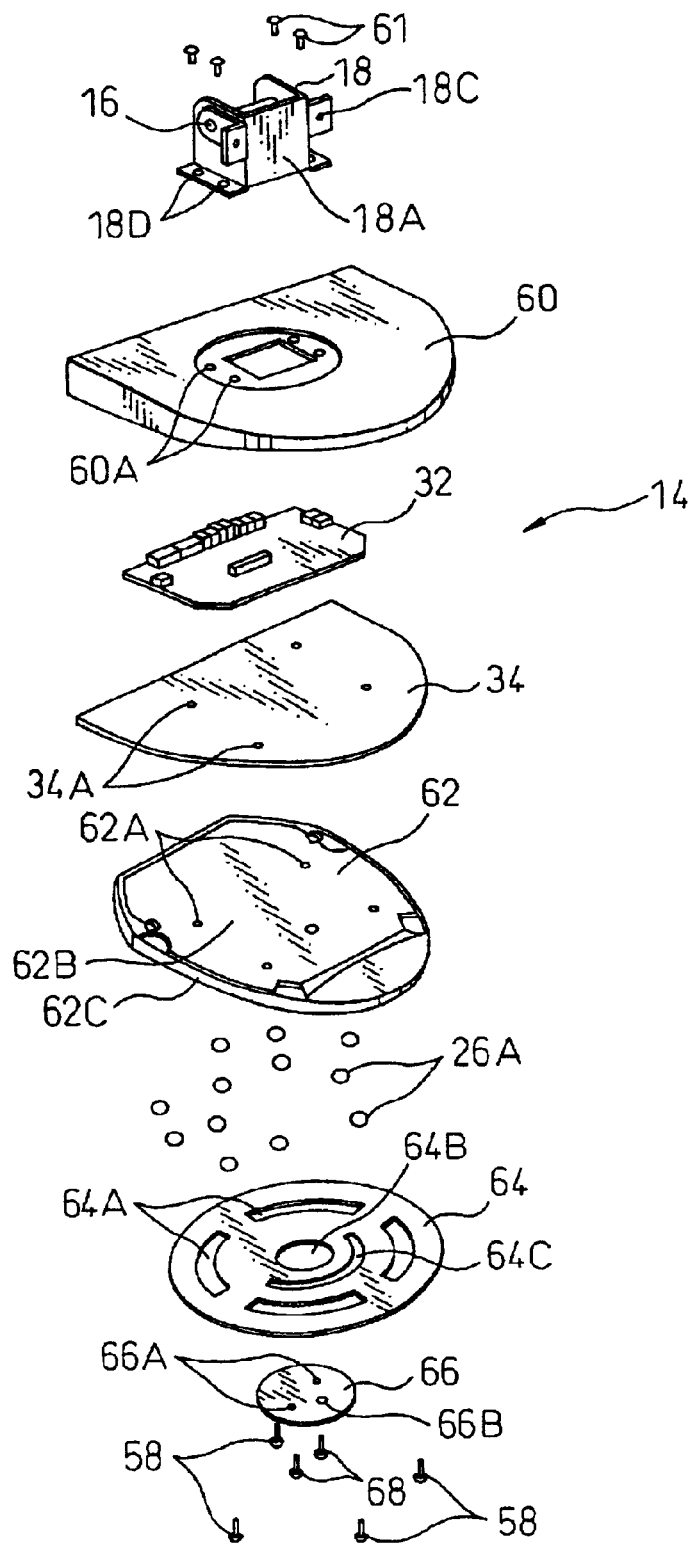
FIG. 20 is an exploded perspective view showing the base part of the display device of FIGS. 16 to 19.

FIG. 20 is an exploded perspective view showing the base part 14 of the display device 10 of FIGS. 16 to 19. Like in the embodiment shown in FIGS. 5 and 11, the base part 14 includes a tilt unit 18 having a horizontal shaft 16. The tilt unit 18 has screw holes 18C for fixing the display part 12 to the base part 14. Therefore, the display part 12 can rotate about the horizontal axis based on the tilt unit 18.

The base part 14 includes a base cover 60, a connector board 32, and a base plate 34. The base cover 60 has screw holes 60A. The tilt unit 18 is fixed to the base cover 60 with screws 61 that are engaged with fixing holes 18D and the screw holes 60A. The base plate 34 is fixed to the base cover 60 with screws not shown.

The fixed base part 14A in FIGS. 16 to 19 corresponds to an assembly consisting of the base cover 60, the connector board 32, and the base plate 34. The base plate 34 is identical to one disposed at the lowest portion of the base part 14 in FIG. 5. The fixed base part 14A is an assembly completed as a base part of a display device that can rotate only about a horizontal axis. The swivel stand 14B shown in FIGS. 16 to 19 can be additionally fitted as an option to the base part of the display device that can rotate only about the horizontal axis. The swivel stand 14B shown in FIGS. 16 to 19 can be transacted as its own.

The base part 14 comprises a turn base cover (a first member) 62, a turn base (a second member) 64, and a plurality of low friction members 26A disposed between the turn base cover 62 and the turn base 64. The low friction members 26A are held by the turn base cover 62, and slide on the turn base 64. The swivel stand 14B shown in FIGS. 16 to 19 comprises the turn base cover 62, the turn base 64, and low friction members 26A.

A turn base holder 66 holds the turn base 64 to the turn base cover 62. The turn base holder 66 has holes 66A and a slit 66B. The turn base holder 66 is held by the turn base cover 62 with screws 68 that pass through the holes 66A. Screws 58 shown at the bottom of FIG. 20 (also shown in FIGS. 17 and 19) pass through the turn base 64 and the turn base cover 62, and screw into the base plate 34. For this purpose, the turn base 64 has arcuate apertures 64A, the turn base cover 62 has holes 62A, and the base plate 34 has screw holes 34A. The arcuate apertures 64A permit the screws 58 and drivers to pass through, and also permit the rotation of the turn base 64.

Figure 21:
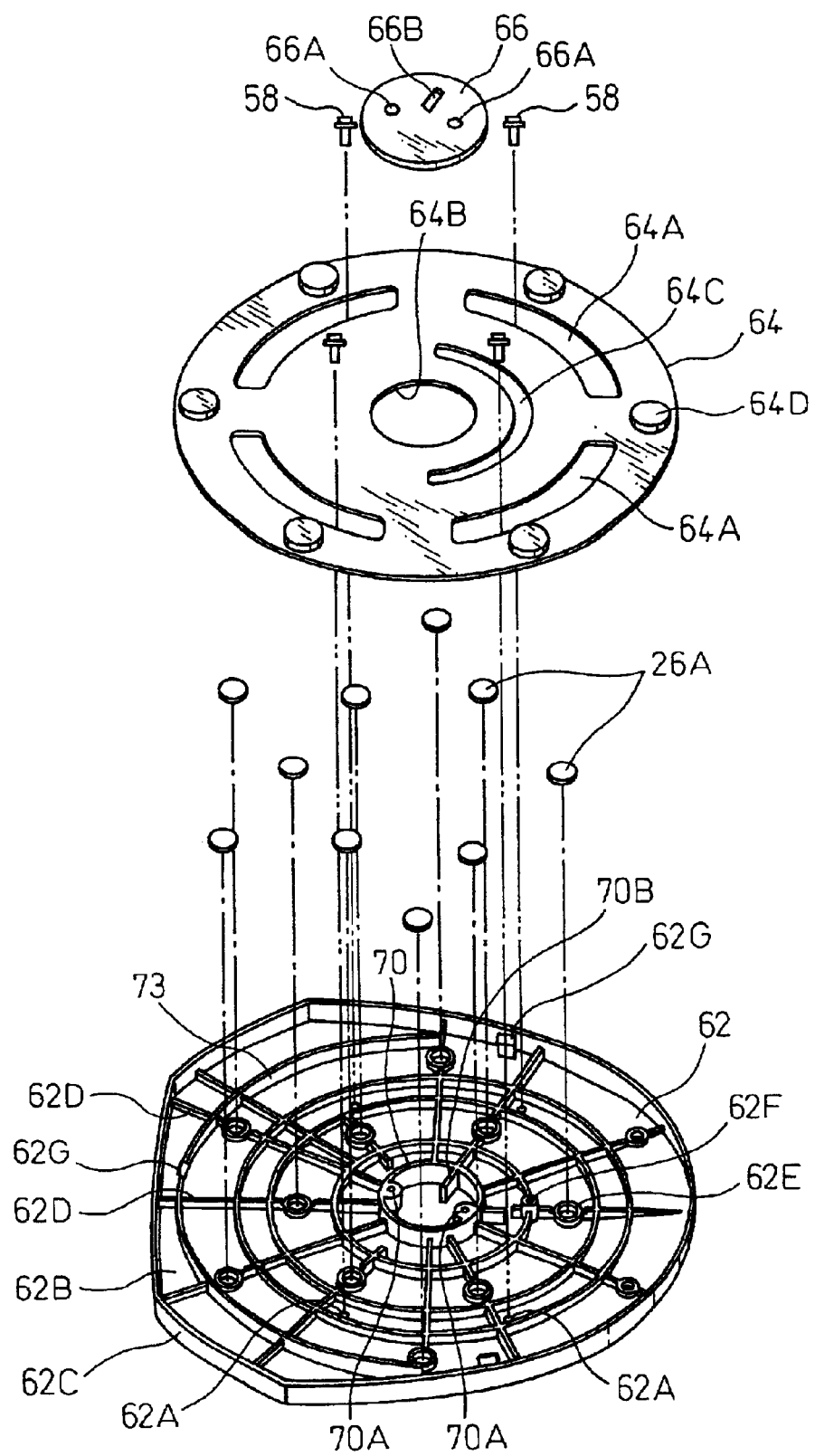
FIG. 21 is an exploded bottom perspective view of the turn base cover and the turn base of FIG. 20, viewed from the bottom side of the supporting member.
Figure 22:
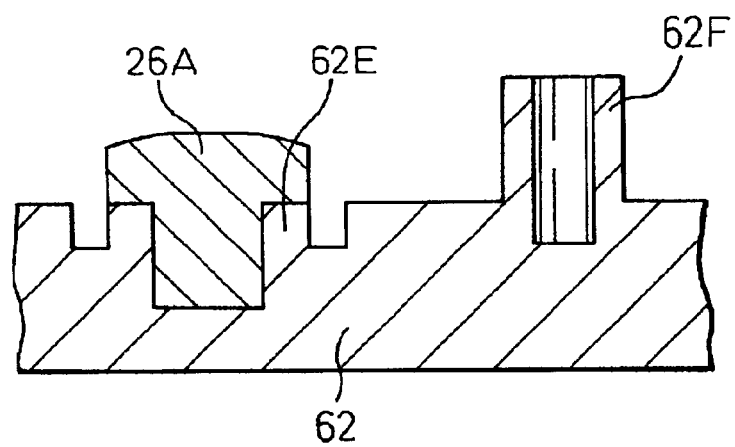
FIG. 22 is a cross-sectional view showing a part of the turn base cover and the low friction members of FIGS. 20 and 21.
Figure 23:
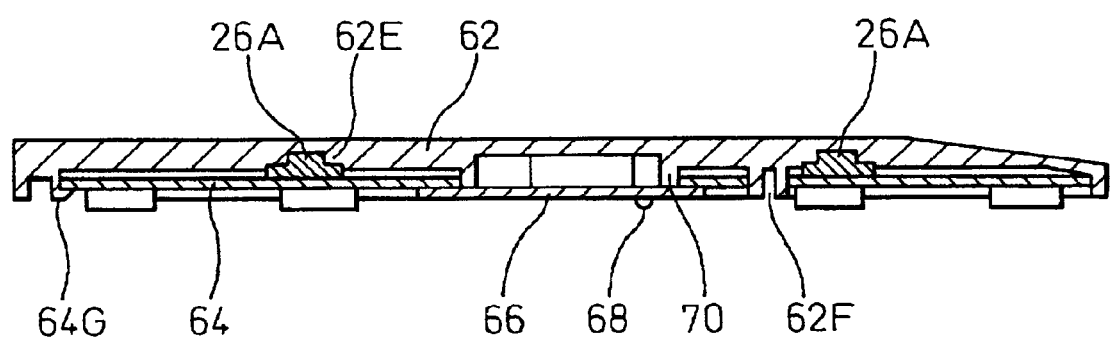
FIG. 23 is a cross-sectional view showing the turn base cover and the turn base combined together.

FIG. 21 is an exploded bottom perspective view of the turn base cover 62 and the turn base 64 of FIG. 20, viewed from the bottom of the base part 14. FIG. 22 is a cross-sectional view showing a portion of the turn base cover 62 and the low friction members 26A. FIG. 23 is a cross-sectional view showing the turn base cover 62 and the turn base 64 combined together.

The turn base cover 62 comprises a flat portion 62B and a skirt portion 62C, as shown in FIG. 20. The turn base cover 62 has a guide part 70 formed by a cylindrical wall at the center, as shown in FIG. 21. The turn base 64 has a circular aperture 64B in the center. The guide part 70 of the turn base cover 62 is fitted in the aperture 64B of the turn base 64, with the turn base cover 62 and the turn base 64 in the facing relationship with each other so that they can rotate relative to each other about the axis of the guide part 70. The turn base 64 is provided with an arcuate rotation limiting groove 64C. Legs 64D are provided on the bottom surface (the upper surface in FIG. 21) of the turn base 64.

In FIG. 21, ribs 62D radially extend on the inner surface (the upper surface in FIG. 21) of the turn base cover 62. Support seats 62E and bulges 62F are provided in the middle of the ribs 62D. The low friction members 26A are supported in the supporting seats 62E. The low friction members 26A are formed as mushroom-shaped spacers. When small-diameter portions of the low friction members 26A are inserted in the holes of the support seats 62E, large-diameter portions of the low friction members 26A slightly project from the inner surface of the turn base cover 62 so that the low friction members can make a slidable contact with the surface of the turn base 64 that faces the inner surface of the turn base cover 62. The surfaces of the large-diameter portions of the low friction members 26A are formed smooth and are preferably curved in a convex shape.

The bulges 62F are inserted into the rotation limiting grooves 64C of the turn base 64, thereby to limit the relative rotation angle between the turn base cover 62 and the turn base 64. There are provided screw holes 70A that are aligned with the holes 66A of the turn base cover 66, and a bulge 70B aligned with the slit 66B of the turn base cover 66, in the inner surface of the turn base cover 62 and the guide part 70, respectively. As shown in FIG. 23, the low friction members 26A are held in the support seats 62E of the turn base cover 62, the turn base 64 is once disposed in the state that the aperture 64B and the guide part 70 are engaged together, and the surface of the turn base 64 becomes substantially flush with the front end of the guide part 70. The turn base holder 66 is then mounted on the turn base 64 and the guide part 70, and the bulge 70B is matched with the slit 66B. The screws 68 are passed through the holes 66A, are screwed into the screw holes 70A and, with this arrangement, the turn base holder 66 holds the turn base 64 so that the turn base 64 does not fall from the turn base cover 62. However, relative rotation between the turn base holder 66 and the turn base 64 is permitted.

Further, the turn base cover 62 has a substantially cylindrical guide part 73 for guiding the outer periphery of the turn base 64. Claws 62G are provided along the guide part 73. The claws 62G are elastically engaged with the periphery of the turn base 64, thereby to hold the turn base 64 so that the turn base 64 does not fall from the turn base cover 62. In this case too, relative rotation between the turn base holder 66 and the turn base 64 is permitted.

In this way, the low friction members 26A permit the display part 12 to rotate on the base part 14 with considerably less friction than the friction applied when the turn base 64 slides directly on the turn base holder 66. As a result, the display part 12 can easily rotate on the base part 14.

Figure 24:
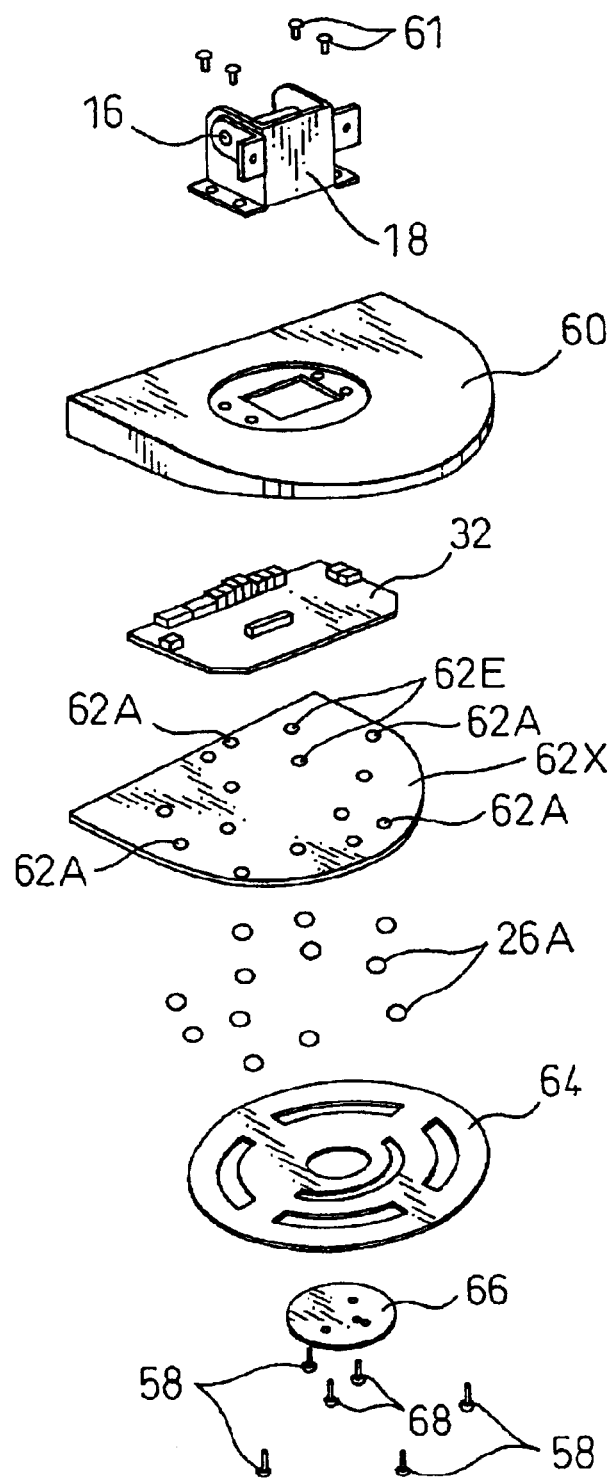
FIG. 24 is an exploded perspective view showing a modified example of the base part of the display device of FIG. 20.

FIG. 24 is an exploded perspective view showing a modified example of the base part 14 of the display device 10 of FIG. 20. As in the embodiment shown in FIG. 20, the base part 14 of the display device 10 comprises the tilt unit 18 having the horizontal shaft 16, the base cover 60, the connector board 32, the turn base cover (first member) 62X, the turn base (second member) 64, a plurality of low friction members 26, and the turn base holder 66. In the base part 14 shown in FIG. 24, the base plate 34 shown in FIG. 20 is deleted. While the turn base cover 62X shown in FIG. 24 has functions similar to those of the turn base cover 62 shown in FIG. 20, the external shape is simplified from that of the turn base cover 62 shown in FIG. 20. The turn base cover 62X is accommodated in the base cover 60. The turn base cover 62X has support seat 62E provided for low friction members 26A and holes 62A in practically one flat plate. In FIG. 24, the turn base cover 62X and the turn base 64 are not optional, and are built into the base part 14 together with the tilt unit 18 from the beginning.

As explained above, according to the present invention, the low friction members permit a relative rotation between the first member and the second member with considerably less friction than the friction applied when the first member slides directly on the second member. As a result, the display part can easily rotate on the base part.

Further, it is possible to improve the degree of freedom of design, by providing seats for holding low friction members in a predetermined number, and by changing the number of low friction members according to the weight of the display part or the shape of the base part. For example, when the display part has a large weight, the number of low friction members is increased. When the display part has little weight, the number of low friction members is decreased. With this arrangement, it is possible to avoid such a problem that the display part rotates too easily, or does not rotate easily. It is not necessary to change a member having seats for holding low friction members.

Further, the display device according to the present invention has the tilt unit for rotating the display part about the first axis, and the rotation supporting mechanism for rotating the display part about the second axis, in a simple structure which is easy to assemble. Particularly, the rotation supporting mechanism is composed of an assembly having three members that can be assembled easily. It is easy to install the tilt unit in this assembly.

What is claimed is:
1. A display device comprising:
 a display part; and
 a base part supporting the display part, said base part comprising:
  a tilt unit to mount the display part thereon for rotation about a first axis;
  a first member directly or indirectly supporting the tilt unit;

a second member disposed in a facing relationship with the first member;

a guide part provided on one of the first member and the second member for guiding the first member and the second member for relative rotation therebetween about a second axis different from the first axis; and a plurality of generally spherical low friction members disposed between the first member and the second member;

wherein said guide part comprises a recessed portion having an inner side wall formed in one of said first and second members to receive and rotationally guide the other of said first and second members, and one of said first and second members holds said low friction members in position.

2. The display device according to claim 1, further comprising a cover having an aperture, wherein the tilt unit is fixed to the first member through the aperture of the cover, and the first member is disposed between the cover and the second member.

3. The display device according to claim 1, further comprising a cover, wherein the tilt unit is fixed to the cover, the cover being directly or indirectly fixed to the first member, the first member being disposed between the cover and the second member.

4. The display device according to claim 3, wherein the low friction member comprises one of a ball-shaped member and a mushroom-shaped member.

* * * * *